BOROSILICATE GLASS
SILICON DIOXIDE
HYDROGEN
TUNGSTEN

United States Patent Office 3,209,190
Patented Sept. 28, 1965

3,209,190
ULTRA-VIOLET DETECTOR
Phillip J. Cade, Winchester, Mass., assignor to Electronics Corporation of America, Cambridge, Mass., a corporation of Massachusetts
Filed July 27, 1962, Ser. No. 212,994
2 Claims. (Cl. 313—101)

This invention relates to electron tubes and more particularly to improved radiation detection tubes particularly adapted for detecting detection of ultraviolet radiation.

The flame in supervised combustion systems has ultraviolet radiation components of wavelengths that are distinct from the wavelengths of ultraviolet radiation components present in solar radiation that reach the earth for example. A detector responsive solely to this distinct range of wavelengths would function as a useful combustion supervising device. In order to provide an accurate and reliable response to combustion flame, however, it is essential that the detector have an abrupt cut off so that it does not respond to extraneous ultraviolet sources such as that from solar radiation. In the manufacture of ultraviolet radiation detectors a tube configuration employing two spaced tungsten electrodes produces a satisfactory response. In such tubes a high degree of purity both of the electrodes and of the gas in the tube is necessary. One or both of these components is so sensitive that migration of minute quantities of elements from the conventional glass tube envelope causes a contamination of the tube components which shortens the tube life and also causes a gradual change in its characteristics with resulting decrease in the reliability of its response to the significant ultraviolet radiation frequencies.

Accordingly, it is an object of the invention to provide a novel and improved ultraviolet radiation detection tube which is sensitive to ultraviolet radiations of the wavelengths of those found in combustion flames but insensitive to ultraviolet radiations of wavelengths found in solar radiation.

Another object of the invention is to provide an ultraviolet radiation detection tube of improved stability and life.

In accordance with the invention there is provided a photosensitive ultraviolet detector tube having two spaced electrodes of highest purity tungsten which are supported in a reducing atmosphere of pure hydrogen within a sealed borosilicate glass envelope that is transparent to ultraviolet radiation. A thin impervious barrier layer of pure silicon dioxide is deposited over the entire inner surface of the envelope. This barrier layer prevents migration of components from the glass which could contaminate either or both the gas or the electrodes and impair the operation of the tube but is transparent to the ultraviolet radiation of interest. Terminal means are provided externally of the tube for connecting the electrodes to a source of electrical energy to create an electromagnetic field between the electrodes. This electromagnetic field is of sufficient magnitude to produce an avalanche breakdown between the electrodes in response to photons of the wavelength of interest impinging on the electrodes indicative that ultraviolet radiation of the wavelengths of interest has been sensed. The tube is preferably operated in a manner to insure that the periodic avalanche breakdown maintains the requisite surface purity of the electrodes, while the impervious barrier layer on the inside of the tube envelope prevents migration of the contaminants from the glass envelope to the gas and the electrodes and possible resulting degradation of the operating characteristics of the tube. In this manner the invention provides a stable and reliable ultraviolet radiation detector tube having response characteristics insensitive to ultraviolet radiation of solar sources.

Other objects, features and advantages of the invention will be seen as the following description of a preferred embodiment of the invention progresses, in conjunction with the drawing, in which.

Figure 1:
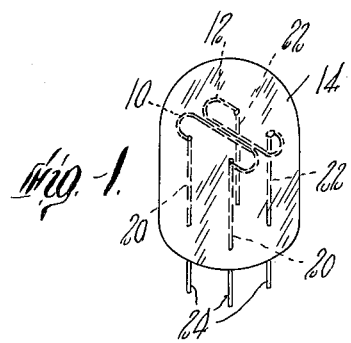
FIG. 1 is a perspective view of an ultraviolet radiation detector tube constructed in accordance with principles of the invention.
Figure 2:
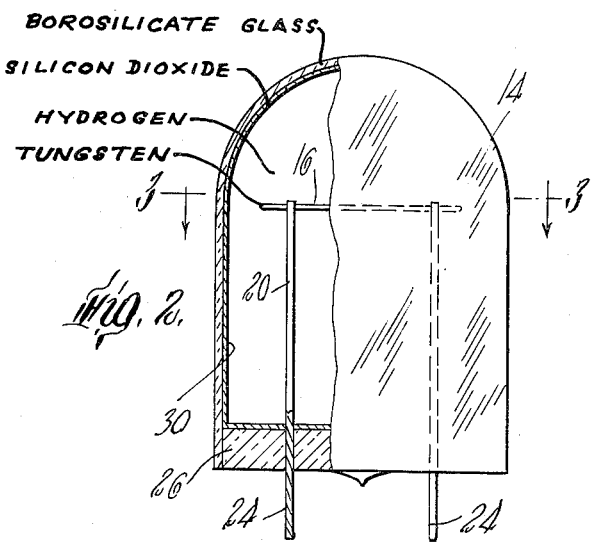
FIG. 2 is a side elevational view, partially in section, of the tube of FIG. 1.
Figure 3:
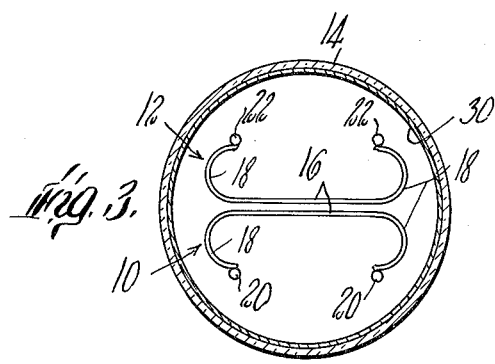
FIG. 3 is a sectional view along the line 3—3 of FIG. 2, illustrating the relation of the tube envelope to the tube electrodes.

The ultraviolet radiation detection tube shown in FIG. 1 has two spaced electrodes 10, 12 mounted within a glass envelope 14 transparent to ultraviolet radiation. Each electrode is a high purity tungsten wire 0.020 inch in diameter having a straight intermediate portion 16 with each end 18 thereof bent in a uniform semicircular arc and secured by welding with a platinum flux to an electrode support 20, 22 respectively. Each electrode support has a terminal portion 24 integral therewith. After welding the entire structure is electrolytically polished in a solution of phosphate of soda so that the entire electrode structure is smooth and free of any contaminating substance. The glass envelope 14 transparent to ultraviolet radiation is, for example, a borosilicate glass such as Corning type 9741 on the inner surface of which a film of silicon dioxide less than 0.001 inch in thickness has been formed. In the formation of this film silicon monoxide is evaporated over the entire surface of the inner surface of the envelope and then it is oxidized to convert it to a continuous layer of silicon dioxide.

The straight intermediate portion 16 of each electrode is accurately secured exactly parallel to the intermediate portion of the other electrode at a distance of 0.040 inch with the supports secured in press 26 and sealed in the envelope 14. After sealing in the envelope the electrodes 10, 12 are then heated by electrical resistance methods to slowly increase their temperature to 1200° C. to drive off any contaminants which may be in the tungsten surface without trapping such contaminants as might occur if the temperature was rapidly raised. This temperature of 1200° C. is maintained for a short period (in the order of fifteen minutes) and then the electrodes rapidly lowered to room temperature (in about one minute), thus producing a pure electrode surface which exhibits the desired photoelectric sensitivity. The tube is then evacuated to a pressure of less than $10^{-5}$ millimeter of mercury (to remove contaminants that have been released from the electrodes) and then filled with hydrogen (passed through a palladium filter) to a pressure of at least about one hundred millimeters of mercury. The integrity of the silicon dioxide barrier film is not adversely affected by the temperature cycling of the electrodes from room temperature to 1200° C. and back again, nor by the subsequent evacuation operation.

The resulting radiation sensitive tube is used in an alternating current circuit in which about seven hundred volts are applied between the electrodes to cyclically establish a high intensity but uniform electric field. The tube is substantially completely insensitive to radiation of wavelengths above about 2800 angstrom units (the lower boundary of solar ultraviolet radiation that reaches the earth). However, it has a saturated response to radiation of wavelengths of 2500 angstrom units—a wavelength prevalent in flame in combustion systems that are to be supervised. The silicon dioxide film provides a rugged and impervious barrier which withstands the extreme conditions to which the tube is exposed during fabrication operations and which prevents contaminants, such as sodium or potassium, from migrating from the glass into the pure hydrogen gas and to the pure tungsten electrodes. The reduced contamination in the area of intense electric field results in a more stable ultraviolet detector device of substantially longer life.

While a preferred embodiment of the invention has been shown and described, modifications thereof will be apparent to those skilled in the art. Therefore, it is not intended that the invention be limited to the disclosed embodiments or to details thereof and departures may be made therefrom within the spirit and scope of the invention as defined in the claims.

I claim:

1. Ultraviolet radiation sensitive apparatus comprising a glass envelope transparent to the radiation of interest, two electrodes of pure tungsten positioned within said envelope,
   each electrode having an active portion disposed in spaced relation to a corresponding portion of the other electrode,
   purified hydrogen gas in said envelope under a pressure in the order of about one hundred millimeters of mercury,
   an impervious barrier layer of silicon dioxide over the entire inside surface of said envelope between said envelope and said electrodes,
   said barrier layer preventing migration of components of the envelope material to said hydrogen gas and said tungsten electrodes,
   and terminal means for connecting said electrodes to a signal source to create an electric field between said electrodes of sufficient magnitude to produce an avalanche breakdown between said electrodes when said electrodes are exposed to incident ultraviolet radiation.

2. Ultraviolet radiation sensitive apparatus comprising a glass envelope transparent to the radiation of interest, two cylindrical wire electrodes of pure tungsten positioned within said envelope,
   each electrode having a straight intermediate portion and a semicircular end portion on either side thereof,
   means to dispose said wire electrodes in a plane with said intermediate portions parallel to each other,
   purified hydrogen gas in said envelope under a pressure in the order of about one hundred millimeters of mercury,
   an impervious barrier layer of silicon dioxide on the entire inside surface of said envelope between said envelope and said electrodes,
   said barrier layer preventing migration of components of the envelope material to said hydrogen gas and said tungsten electrodes,
   and terminal means for connecting said electrodes to a signal source to create an electric field between said spaced intermediate portions of said electrodes of sufficient magnitude to produce avalanche breakdown of the hydrogen gas between said electrodes when said electrodes are exposed to incident ultraviolet radiation of wavelengths less than 2800 A.

References Cited by the Examiner

UNITED STATES PATENTS

| | | | |
|---|---|---|---|
| 2,030,389 | 2/36 | Navias | 313—221 |
| 2,808,351 | 10/57 | Colbert et al. | 117—217 X |
| 2,909,696 | 10/59 | Cooper | 313—221 |
| 3,103,589 | 9/63 | Howling | 313—93 X |

GEORGE N. WESTBY, *Primary Examiner.*

DAVID J. GALVIN, *Examiner.*